(12) United States Patent
Hoglund

(10) Patent No.: US 9,778,014 B2
(45) Date of Patent: *Oct. 3, 2017

(54) METHOD AND POSITION SENSOR ASSEMBLY FOR DETERMINING A MUTUAL POSITION BETWEEN A FIRST OBJECT AND A SECOND OBJECT

(71) Applicant: FREEVALVE AB, Angelholm (SE)

(72) Inventor: Anders Hoglund, Munka Ljungby (SE)

(73) Assignee: FREEVALVE AB, Angelholm (SE)

(*) Notice: Subject to any disclaimer, the term of this patent is extended or adjusted under 35 U.S.C. 154(b) by 358 days.

This patent is subject to a terminal disclaimer.

(21) Appl. No.: 14/408,622

(22) PCT Filed: Jun. 25, 2013

(86) PCT No.: PCT/SE2013/050765
§ 371 (c)(1),
(2) Date: Dec. 17, 2014

(87) PCT Pub. No.: WO2014/003650
PCT Pub. Date: Jan. 3, 2014

(65) Prior Publication Data
US 2015/0247718 A1    Sep. 3, 2015

(30) Foreign Application Priority Data

Jun. 28, 2012  (SE) ...................... 1250721

(51) Int. Cl.
*G01B 7/00*   (2006.01)

(52) U.S. Cl.
CPC .......... *G01B 7/003* (2013.01); *F01L 2201/00* (2013.01); *F01L 2820/045* (2013.01)

(58) Field of Classification Search
CPC ....................................................... G01B 7/003
See application file for complete search history.

(56) References Cited

U.S. PATENT DOCUMENTS

| 5,927,275 A | 7/1999 | Löser et al. |
| 7,032,549 B1 | 4/2006 | Verner et al. |

(Continued)

FOREIGN PATENT DOCUMENTS

| DE | 10049505 | 5/2001 |
| DE | 102005026945 | 1/2006 |

(Continued)

OTHER PUBLICATIONS

Extended European Search Report dated Apr. 7, 2016; Application No. 13809643.3.

(Continued)

*Primary Examiner* — Jermele M Hollington
*Assistant Examiner* — Feba Pothen
(74) *Attorney, Agent, or Firm* — Young & Thompson

(57) ABSTRACT

A method and position sensor assembly for determining a mutual position between a first object and a second object. The position sensor assembly includes a first body, a coil, a control unit, and a sensor circuit, the first body being reciprocally displaceable in the axial direction in relation to the coil. The sensor circuit includes in turn a comparator connected to a first branch including the coil, a power switch, and a measuring resistance coupled in series with each other.

13 Claims, 8 Drawing Sheets

(56) References Cited

U.S. PATENT DOCUMENTS

| 8,485,148 B2 | 7/2013 | Schiemann |
| 2007/0012268 A1 | 1/2007 | Nakamura |
| 2009/0014672 A1 | 1/2009 | Schiemann |
| 2009/0049463 A1* | 2/2009 | Ueda ........................ H02P 6/28 720/695 |
| 2009/0206288 A2 | 8/2009 | Schiemann |
| 2010/0072994 A1* | 3/2010 | Lee ........................ G01N 24/08 324/307 |

FOREIGN PATENT DOCUMENTS

| DE | 102007025619 | 12/2008 |
| WO | 2004/042318 | 5/2004 |

OTHER PUBLICATIONS

International Search Report dated Nov. 5, 2013, corresponding to PCT/SE2013/050765.

* cited by examiner

METHOD AND POSITION SENSOR ASSEMBLY FOR DETERMINING A MUTUAL POSITION BETWEEN A FIRST OBJECT AND A SECOND OBJECT

TECHNICAL FIELD OF THE INVENTION

The present invention relates generally to a method and position sensor assembly for determining a mutual position between a first object and a second object. In particular, the present invention relates to a method and position sensor assembly for determining a mutual position between a valve and a valve seat in a combustion engine. The position sensor assembly comprises a first body, a coil, a control unit, and a sensor circuit, said first body being reciprocally displaceable in the axial direction in relation to said coil. The sensor circuit comprises in turn a comparator connected to a first branch comprising said coil, a power switch, and a measuring resistance coupled in series with each other.

Herein, the present invention will be described in connection with the determination of mutual position between a valve and a valve seat without being limited thereto; for instance, the present invention may be used for determining mutual position between different parts of an automatic clutch of a power train in a vehicle, or the like, where positioning of objects having high speed has to be made with high precision.

BACKGROUND OF THE INVENTION AND PRIOR ART

Position sensor assemblies arranged to determine/follow the position of a valve in the cylinder of a combustion engine are known since long. Early variants of position sensor assemblies were, however, not sufficiently fast and exact to be usable in connection with objects moving at very high speed, such as valves in a combustion engine in a car. In the car industry, there are additional requirements that the systems to be used should be robust and have great reliability at minimal cost. In recent years, systems have appeared that comprise a stationary coil/inductor that interacts with a movable body manufactured from an electrically conductive material, said movable body being connected to the valve and moving together therewith.

See, for instance, U.S. Pat. No. 7,032,549, which discloses a position sensor assembly comprising an oscillator, a first body, a coil, a control unit, and a sensor circuit, said first body being reciprocally displaceable in the axial direction in relation to and externally of said coil. The sensor circuit comprises in turn a comparator connected to a first branch comprising said coil, an oscillator, and a measuring resistance coupled in series with each other. When the coil is energized, it is arranged to generate an oscillating magnetic field, which in turn induces eddy currents in the displaceable body, which causes the coil to be short-circuited. The degree of short circuit of the coil changes proportionally to the change of the mutual overlap between the coil and the body. Then the comparator determines the position of the valve based on the phase shift between the supply voltage of the oscillator and the voltage across the measuring resistance, the phase shift increasing with increasing overlap between the coil and the body.

However, said position sensor assembly is impaired by the disadvantage that the same comprises an oscillator, or a similar signal generator that provides an alternating voltage signal, which, relatively speaking, is energy demanding since the oscillator continuously is in operation. Furthermore, said method comprises partly analog signals, which entails that the mutual position only can be determined with, relatively speaking, low time and location resolution.

BRIEF DESCRIPTION OF THE OBJECTS OF THE INVENTION

The present invention aims at obviating the above-mentioned disadvantages and failings of previously known position sensor assemblies and at providing an improved method and position sensor assembly for determining a mutual position between a first object and a second object. A primary object of the invention is to provide an improved method and position sensor assembly of the type defined by way of introduction, wherein the determination of the mutual position can be carried out with high precision and simultaneously low energy consumption.

Another object of the present invention is to provide a method that enables selectable distance between mutually isolated determinations of the mutual position.

It is another object of the present invention to provide a position sensor assembly that is entirely digitized, which gives a simple and inexpensive solution that still enables the determination of the mutual position with high precision.

It is another object of the present invention to provide a position sensor assembly that is robust and contact free.

It is another object of the present invention to provide a position sensor assembly that comprises few and inexpensive components.

BRIEF DESCRIPTION OF THE FEATURES OF THE INVENTION

According to the invention, at least the primary object is achieved by means of the method and the position sensor assembly that are defined by way of introduction and have the features defined in the independent claims. Preferred embodiments of the present invention are furthermore defined in the depending claims.

According to a first aspect of the present invention, a method is provided of the type defined by way of introduction, which comprises the steps of:
sending an upflank of a digital input signal pulse from the control unit to the power switch to produce a state change of the power switch from open to closed,
in the control unit, detecting a first state change of an output signal from the comparator, and
determining a mutual position between said first body and said coil based on the delay between the upflank of the input signal pulse and the first state change of the output signal,
or comprises the steps of:
sending an upflank of a digital input signal pulse from the control unit to the power switch to produce a state change of the power switch from open to closed,
in the control unit, detecting a first state change of the output signal from the comparator,
in the control unit, detecting a second state change of said output signal, and
determining a mutual position between said first body and said coil based on the delay between the first state change of the output signal and the second state change of the output signal.
According to a second aspect of the present invention, a position sensor assembly is provided, the sensor circuit of which comprises:

a first branch comprising said coil, a measuring resistance, and a power switch having an input operatively connected to said control unit for receiving individual digital input signal pulses, and a comparator, which is connected to said first branch via a first input to obtain an instantaneous measuring voltage across the measuring resistance, and which further comprises a second input for obtaining an instantaneous reference voltage, and an output operatively connected to said control unit for outputting individual state changes of a digital output signal based on the mutual relationship between said measuring voltage and said reference voltage.

Thus, the present invention is based on the understanding that by utilizing individual digital input signal pulses as well as individual digital output signal pulses caused thereby, possibility is obtained of determining the mutual position between a first object and a second object with large time and location resolution as well as low energy consumption.

According to a preferred embodiment of the present invention, said first state change of the output signal from the comparator is an upflank of a digital output signal pulse, and wherein said second state change of the output signal from the comparator is a downflank of said digital output signal pulse.

According to a preferred embodiment, the sensor circuit of the position sensor assembly comprises a feedback branch connected between the output of the comparator and the second input of the comparator. This means that, upon state change of the output signal from the comparator, the determination of the mutual position is facilitated as a consequence of the state change being ensured and multiple fast state changes caused by electrical noise, etc., are eliminated.

Preferably, the first body of the position sensor assembly is displaceable in the axial direction internally of the coil. This entails that a stronger inductance change and thereby a better relationship between signal and noise can be achieved by a coil having a given inductance at a given driving power.

Further advantages and features of the invention are evident from the other dependent claims as well as in the following, detailed description of preferred embodiments.

BRIEF DESCRIPTION OF THE DRAWINGS

A more complete understanding of the above-mentioned and other features and advantages of the present invention will be clear from the following, detailed description of preferred embodiments, reference being made to the accompanying drawings, wherein.

DETAILED DESCRIPTION OF PREFERRED EMBODIMENTS

Figure 1:
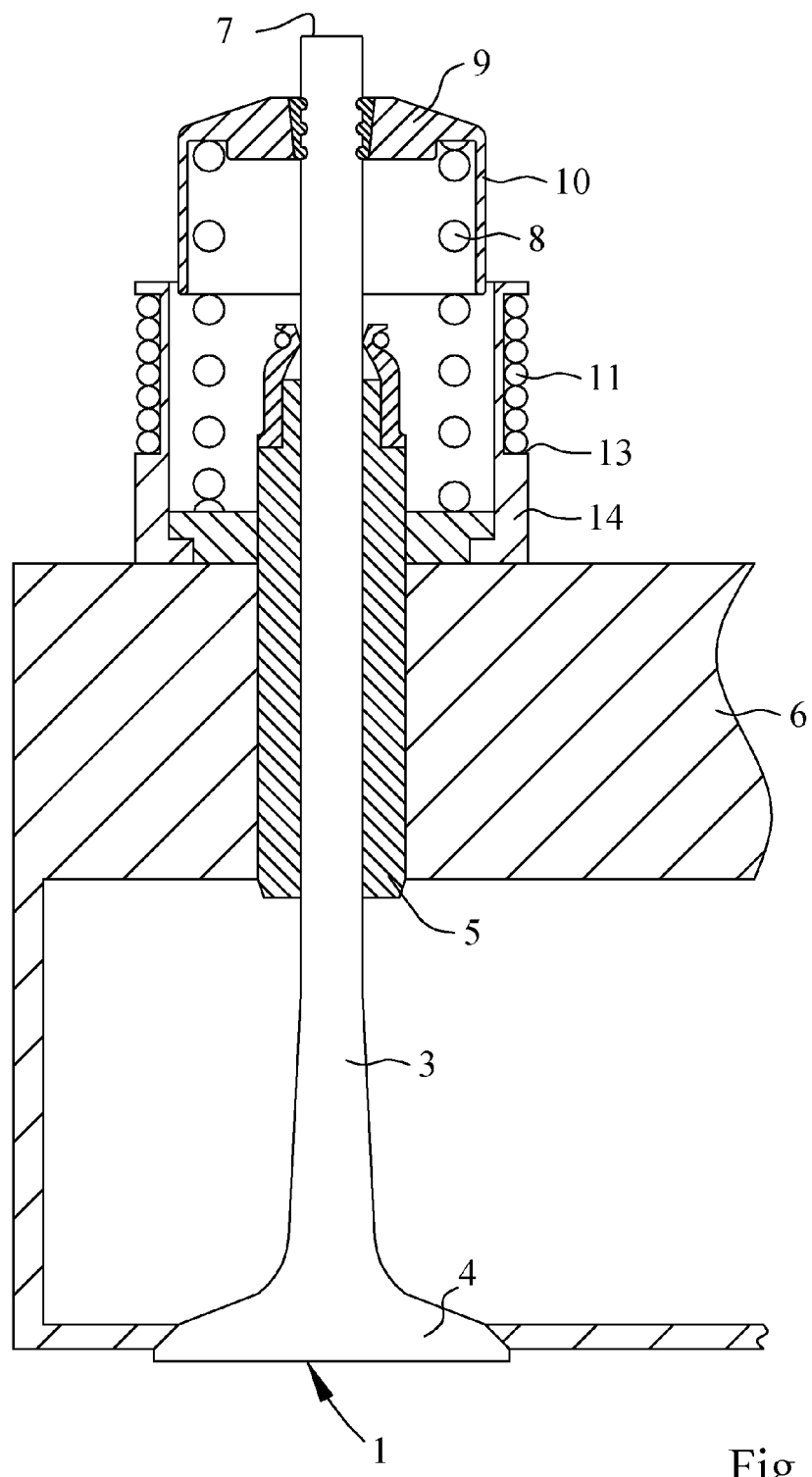
FIG. 1 is a schematic cross-sectional view of a valve connected to a position sensor assembly according to the invention, having the valve in closed state.
Figure 2:
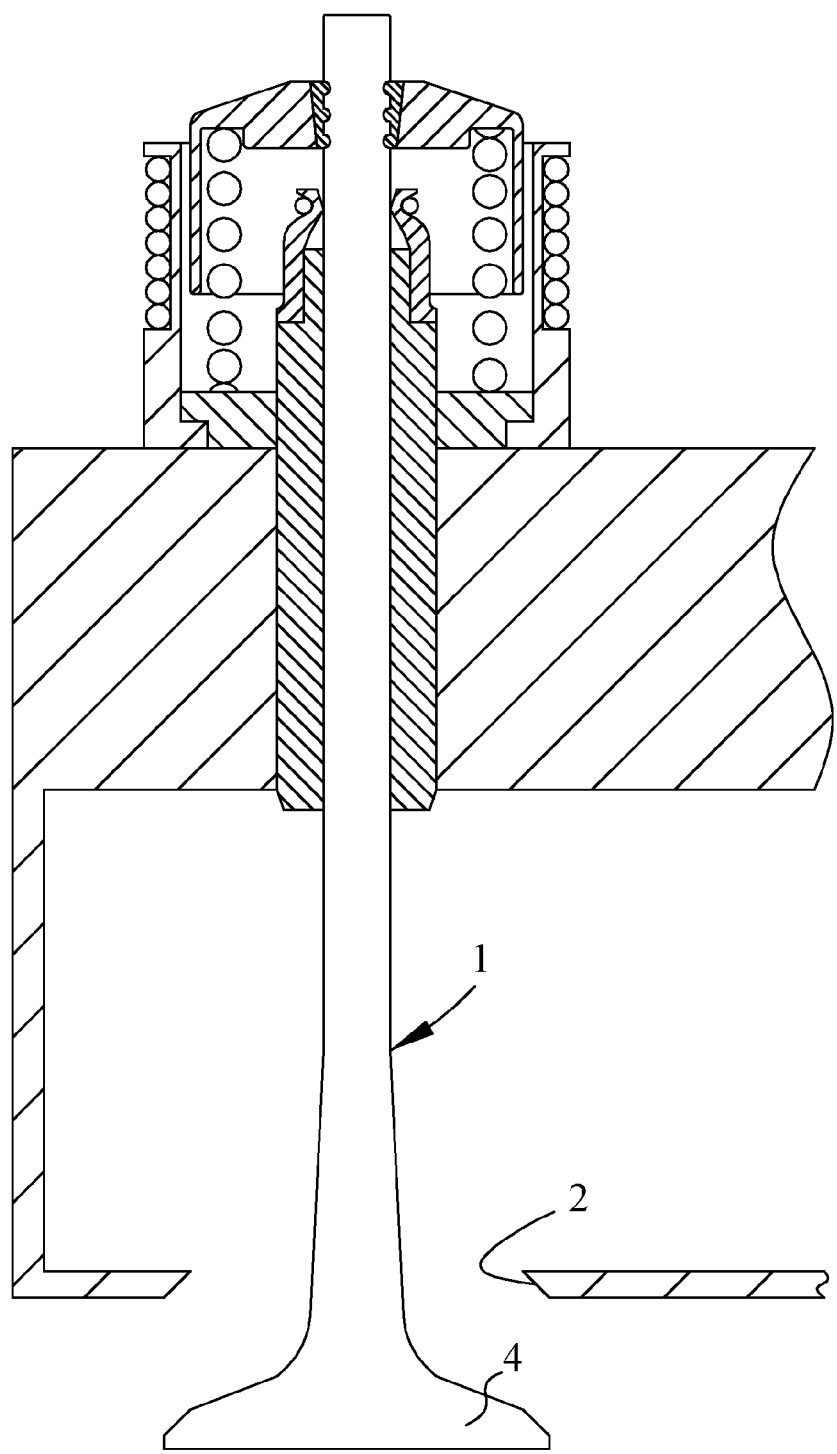
FIG. 2 is a schematic cross-sectional view of the valve in FIG. 1, having the valve in open state.

Reference is initially made to FIGS. 1 and 2, which show an example of an application comprising the present invention. The present invention relates generally to a method and position sensor assembly for determining a mutual position between a first object 1 and a second object 2. In the application shown in FIGS. 1 and 2, said first object is a valve 1 and said second object is a valve seat 2, which are disposed in a combustion engine. Hereinbelow, the present invention will be described in connection with the determination of mutual position between a valve 1 and a valve seat 2 without being limited thereto. The valve 1 is reciprocally displaceable in the axial direction between a closed position, FIG. 1, and an open position, FIG. 2. It should be pointed out that the valve 1 may be an inlet valve as well as an outlet valve in one of the cylinders of the combustion engine.

The valve 1 has a valve stem 3 and a valve head 4. The valve stem 3 extends through and is guided by a valve stem seal 5 and the valve head 4 is arranged to interact with said valve seat 2 for alternately permitting and preventing, respectively, passage of gas. The valve stem seal 5 is arranged in a through hole in a stationary part 6 of the combustion engine. The valve 1 is preferably displaceable by means of a pneumatic and/or hydraulic actuator (not shown), which acts on an upper end 7 of the valve stem 3 of the valve 1 to displace the valve 1 from the closed position thereof to the open position thereof. Furthermore, the combustion engine preferably comprises a conventional, schematically shown, valve spring 8, which is arranged to bring back the valve 1 from the open position thereof to the closed position thereof. The valve spring 8 acts in the lower end thereof directly or indirectly against the stationary part 6 of the combustion engine, and in the upper end thereof against a carrier 9, or valve spring retainer, which is connected to the valve stem 3 in the area of the upper end 7 thereof.

A position sensor assembly is arranged to determine the mutual position between the valve 1 and the valve seat 2, i.e., determine where the valve 1 is and to which degree the valve opening of the valve seat 2 is open, or in other words the present valve lift.

Figure 3:
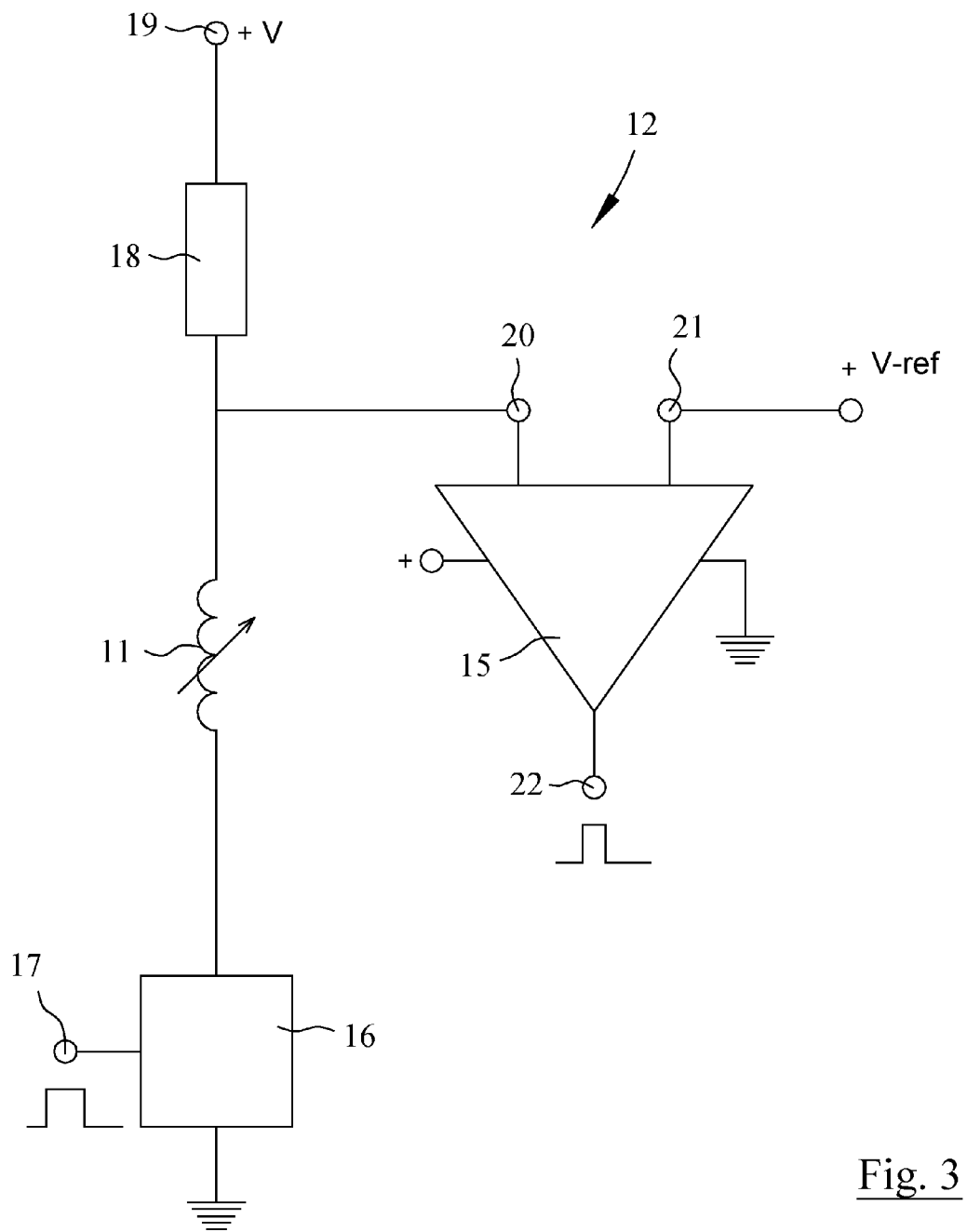
FIG. 3 is a schematic representation of a sensor circuit according to a first embodiment.

Reference is now also made to FIG. 3, which shows a schematic representation of a sensor circuit according to a first embodiment. The position sensor assembly comprises a first body 10 connectable to said valve 1, a coil or inductor 11 connectable to said valve seat 2, a control unit (not shown), and a sensor circuit, generally designated 12. The control unit is a unit that reads instructions, interprets the same and then gives requisite instructions to another unit.

The first body 10 is an electrically conductive body, preferably manufactured from a non-magnetic metal, such as aluminum. However, it is feasible that said first body 10 is manufactured from a magnetic metal, such as a compressed iron powder body. It should be pointed out that the first body 10 preferably is connected to the carrier 9, or that the carrier 9 is a part of said first body 10. Said first body 10 is reciprocally displaceable in the axial direction in relation to said coil 11, and said first body 10 is preferably displaceable in the axial direction, radially internally of the coil 11. In the embodiment shown, the first body 10 consists of a tube segment, which has an outer diameter of 25 mm and which is concentrically disposed in relation to the valve stem 3, the valve spring 8 being disposed radially internally of said first body 10.

The coil 11 is, in the embodiment shown, disposed in a seat 13 of a sleeve 14 that is connected to the stationary part 6 of the combustion engine. The sleeve 14, the seat 13 and the coil 11 are preferably concentrically disposed in relation to the valve stem 3. The coil 11 is preferably manufactured from copper and comprises, for instance, 44 windings having an inner diameter of 28 mm.

The sensor circuit 12 comprises a first branch and a comparator 15. The first branch of the sensor circuit 12 comprises said coil 11, a power switch 16 having an input 17 operatively connected to said control unit for inputting individual digital input signal pulses, and a measuring resistance 18, the coil 11, the power switch 16, and the measuring resistance 18 being coupled in series with each other. Furthermore, said first branch is connected between a voltage source 19 and ground, which voltage source 19 preferably is approximately +5 V. It should be pointed out that said coil may consist of two coils connected in series, a first coil of which belongs to a first valve and a second coil belongs to a second valve, provided that the first valve and the second valve does not have overlapping valve lift curves.

The comparator 15 of the sensor circuit 12 is connected to said first branch via a first input 20 to obtain an instantaneous measuring voltage across the measuring resistance 18, and comprises a second input 21 to obtain an instantaneous reference voltage and an output 22 operatively connected to said control unit for outputting individual state changes of a digital output signal.

The comparator 15 is arranged to obtain and compare instantaneous measuring voltage across the measuring resistance 18 and instantaneous reference voltage, and is arranged to, based on the mutual relationship between the measuring voltage and reference voltage, generate a state change of the digital output signal. A state change of the digital output signal from the output 22 of the comparator 15 is generated when the measuring voltage and reference voltage mutually change magnitude rank, i.e., mutually change order regarding which value that is greatest among them.

The position sensor assembly operates in the following way. When the valve 1 is displaced in relation to the valve seat 2, in order to let in or out gas from the cylinder of the combustion engine, also the first body 10 is displaced in relation to the coil 11. When the overlap between the first body 10 and the coil 11 increases, the time elapsed for the measuring voltage to be changed a predetermined value decreases in proportion thereto, as a consequence of the coil 11 being short-circuited to different degrees by the impact from the first body 10. According to a preferred embodiment, the duration of change is approximately 5.5 μs at 0 mm overlap, approximately 4.0 μs at 5 mm overlap, and approximately 2.8 μs at 10 mm overlap. The measuring voltage across the measuring resistance 18 is changed when the voltage across the coil 11 is changed, and the voltage across the coil 11 is changed as a consequence of a state change of the power switch 16 from open to closed taking place.

Within the scope of the common inventive concept of the present invention, said duration of change may be determined according to two methods, which methods give a consistent contribution to the prior art, but which are realizations of the same fundamental idea that is not suitable to be defined unanimously.

According to the first method, the method according to the invention comprises the steps of: sending an upflank, or positive flank, of a digital input signal pulse from the control unit to the power switch 16 to produce a state change of the power switch 16 from open to closed; in the control unit, detecting a first state change of the output signal from the comparator 15, and; determining a mutual position between said first body 10 and said coil 11 based on the time delay between the upflank of the input signal pulse and the first state change of the output signal. The determination of said mutual position may take place in said control unit or in another component that is operatively connected to the control unit.

According to the second method, the method according to the invention comprises the steps of: sending an upflank of a digital input signal pulse from the control unit to the power switch 16 to produce a state change of the power switch 16 from open to closed; in the control unit, detecting a first state change of the output signal from the comparator 15; in the control unit, detecting a second state change of said output signal, and; determining a mutual position between said first body 10 and said coil 11 based on the time delay between the first state change of the output signal and the second state change of the output signal. The determination of said mutual position may take place in said control unit or in another component that is operatively connected to the control unit.

The above-mentioned first method is based on a sensor circuit design wherein there is a time delay between the upflank of the input signal pulse and the first state change of the output signal. The above-mentioned second method is instead based on a sensor circuit design wherein the upflank of the input signal pulse and the first state change of the output signal take place together.

Preferably, said first state change of the output signal from the comparator 15 is an upflank of a digital output signal pulse, said second state change of the output signal from the comparator 15 being a downflank of said digital output signal pulse.

According to a preferred embodiment, the above-mentioned first method also comprises the step of, based on the detection of said first state change of the output signal from the comparator 15, sending a downflank, or negative flank, of said digital input signal pulse from the control unit to the power switch 16 to produce a state change of the power switch 16 from closed to open. According to a preferred embodiment, the above-mentioned second method also comprises the step of, based on the detection of said second state change of the output signal from the comparator 15, sending a downflank of said digital input signal pulse from the control unit to the power switch 16 to produce a state change of the power switch 16 from closed to open. In other words, the duration of the digital input signal pulse should be held as short as possible to save energy.

A large advantage of the present invention is that the determination of the mutual position between the valve 1 and the valve seat 2 can be selected to only be made when there is a reason to determine the mutual position, i.e., when the valve 1 is in motion. The motion of the valve 1 is based on the crankshaft motion of the combustion engine, and is in a normal combustion engine in motion during approximately a ½ turn of a full revolution of crankshaft. During the period of time the valve 1 is in motion, the determination of the position of the valve 1 preferably is made once per crank angle degree, i.e., approximately 180 times during one revolution of the crankshaft. However, it should be mentioned that the mutual position between the valve 1 and the valve seat 2 also may be determined when the valve 1 is not in motion, for instance, when the valve 1 is in contact with the valve seat 2, among other things in order to calibrate the position sensor assembly.

Hereinbelow, a number of realizations of the sensor circuit 12 of the position sensor assembly will be described, which all have in common that the sensor circuit 12 comprises a second branch connected between the voltage source 19 and ground and comprising a first reference resistance 23 and a second reference resistance 24, which are coupled in series with each other, the second input 21 of the comparator 15 being connected to said second branch at a point situated between said first reference resistance 23 and said second reference resistance 24. Furthermore, the first input 20 of the comparator 15 is connected to said first branch at a point situated between said measuring resistance 18 and the coil 11.

Figure 4:
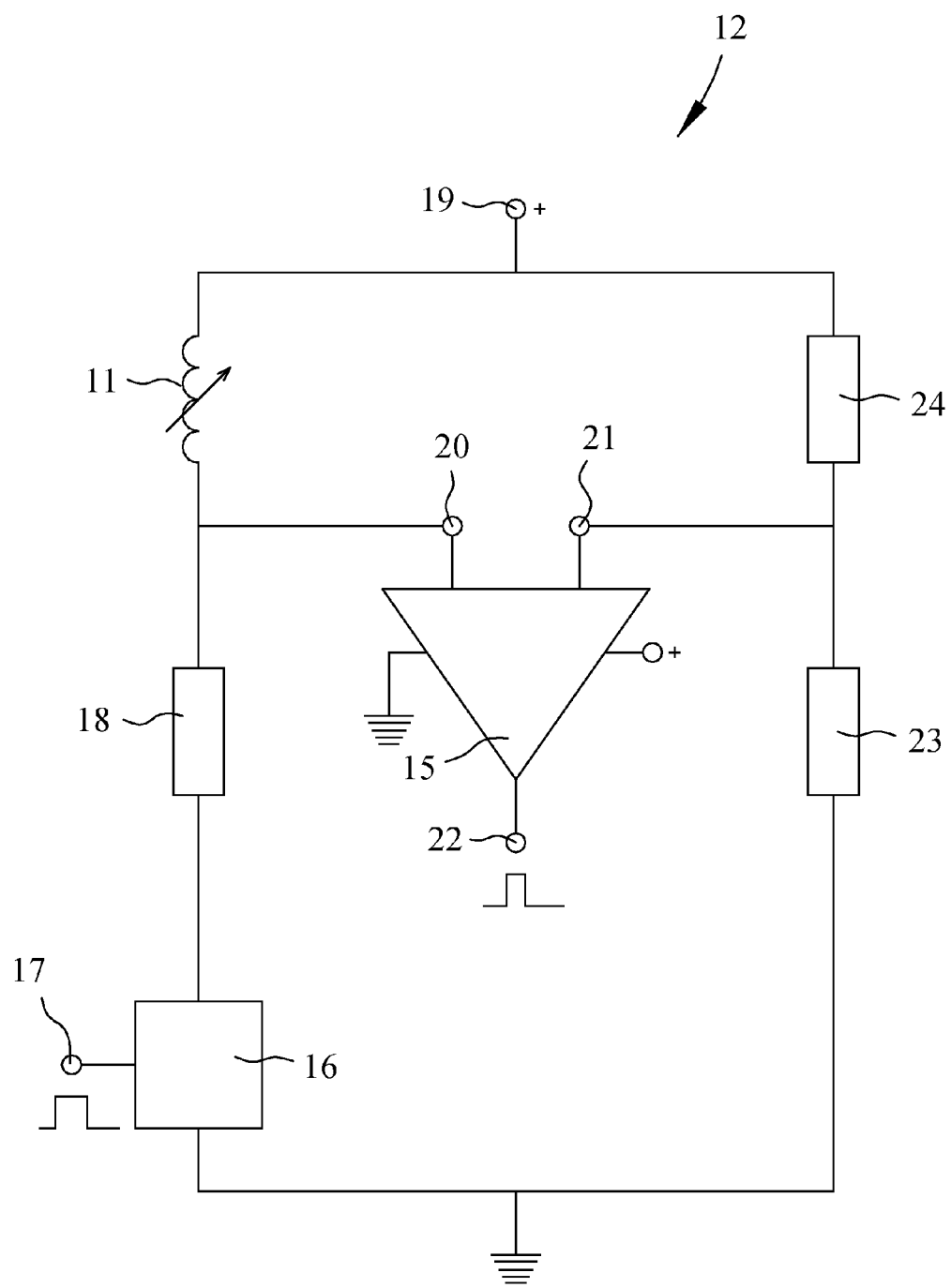
FIG. 4 is a schematic representation of a sensor circuit according to a second embodiment.
Figure 5:
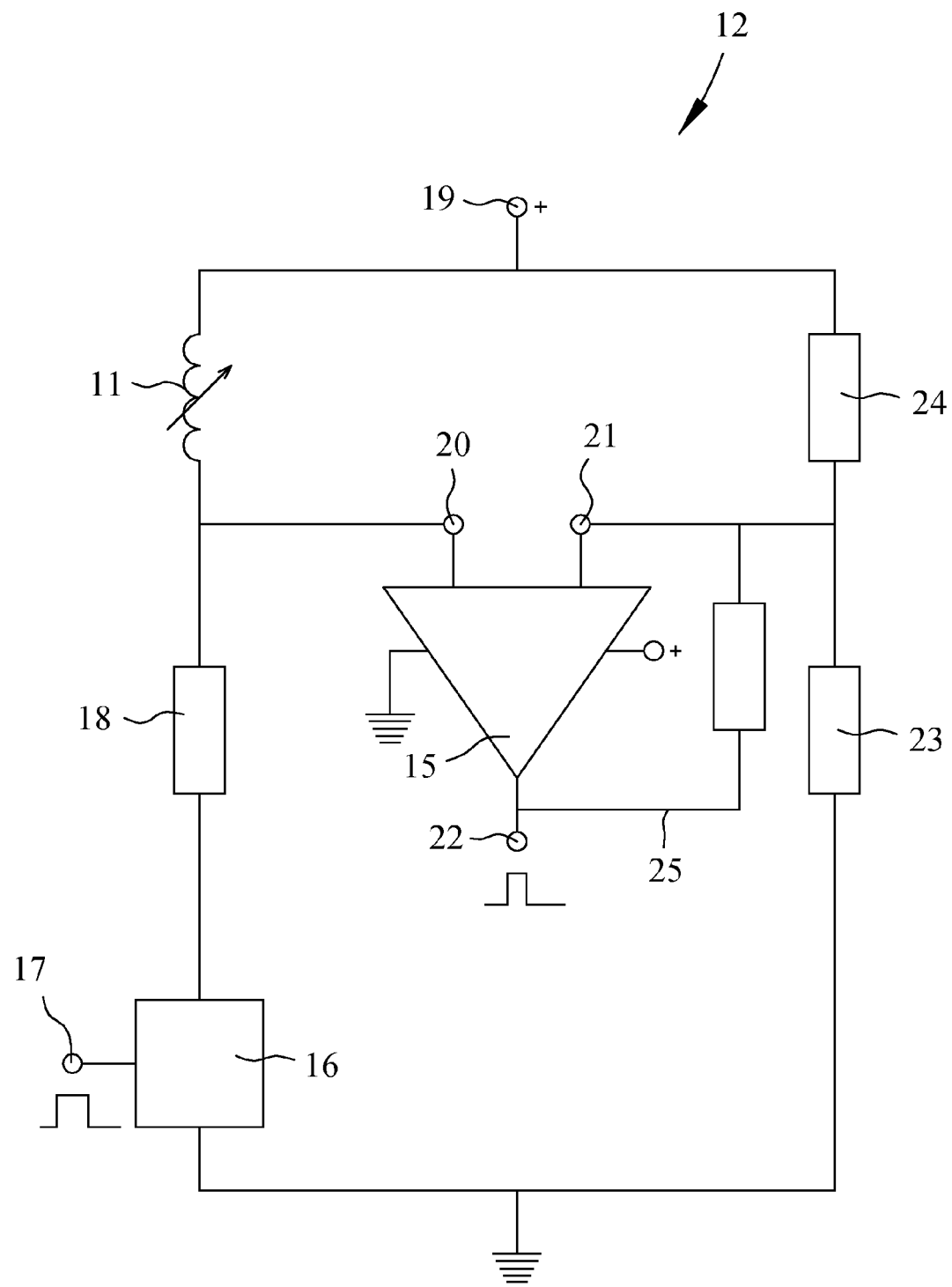
FIG. 5 is a schematic representation of a sensor circuit according to a third embodiment.

In order to function according to the above-mentioned first method, the sensor circuit 12 may, for instance, be realized in accordance with FIG. 4, which shows a schematic representation of the sensor circuit 12 according to a second embodiment, or in accordance with FIG. 5, which shows a schematic representation of the sensor circuit 12 according to a third embodiment. Common to these embodiments is that the coil 11 is situated between the voltage source 19 and the point on the first branch that is connected to the first input 20 of the comparator 15. It should be pointed out that the position of the power switch 16 in relation to the coil 11 and the measuring resistance 18 is freely selectable. In the third embodiment shown in FIG. 5, the sensor circuit 12 comprises, in addition to what is shown in the second embodiment according to FIG. 4, a feedback branch 25, or amplification branch, connected between the output 22 of the comparator 15 and the second input 21 of the comparator 15, in order to ensure the state change of the output signal of the comparator 15 for eliminating multiple fast state changes caused by electrical noise, etc.

Figure 6:
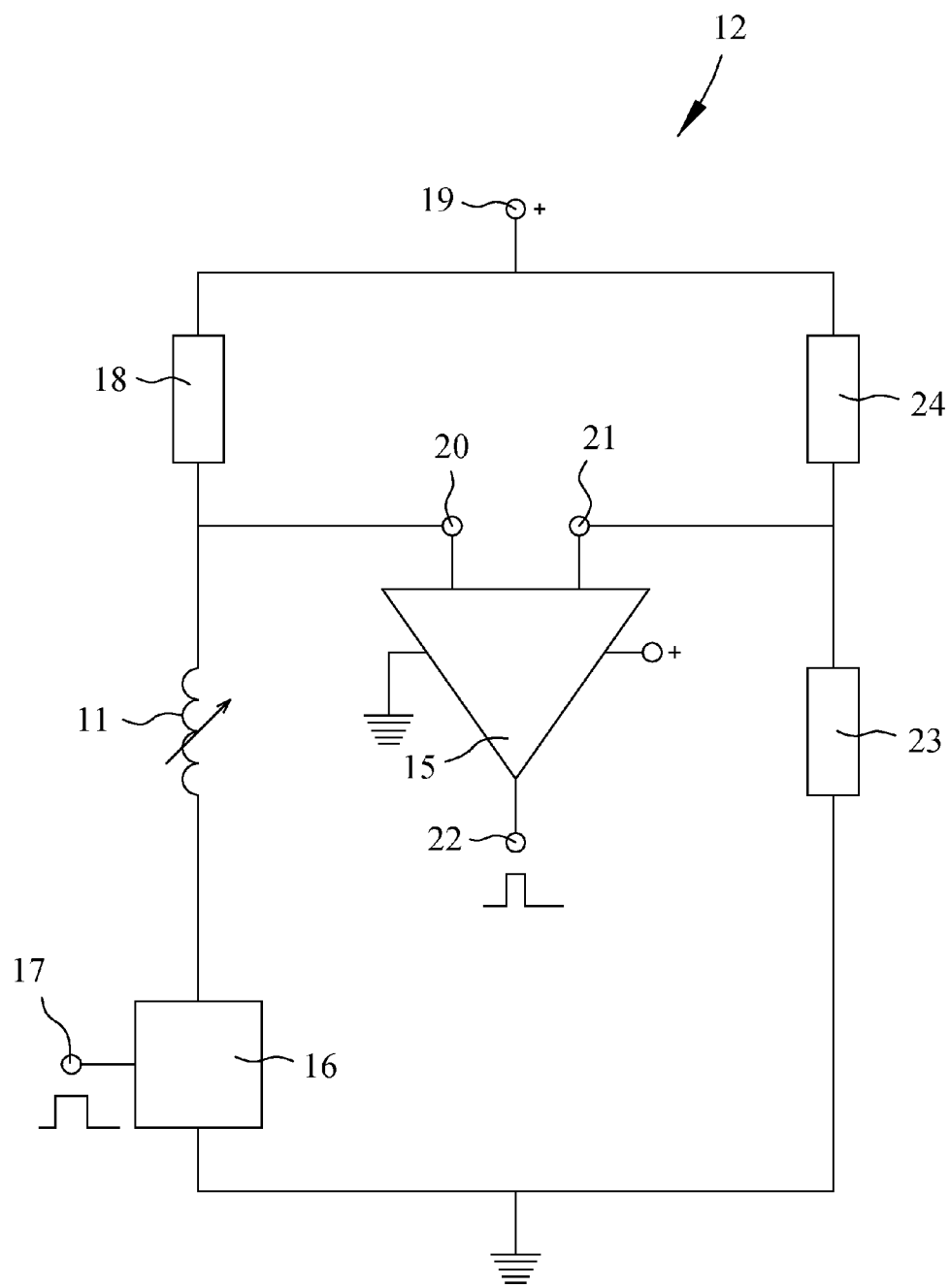
FIG. 6 is a schematic representation of a sensor circuit according to a fourth embodiment.
Figure 7:
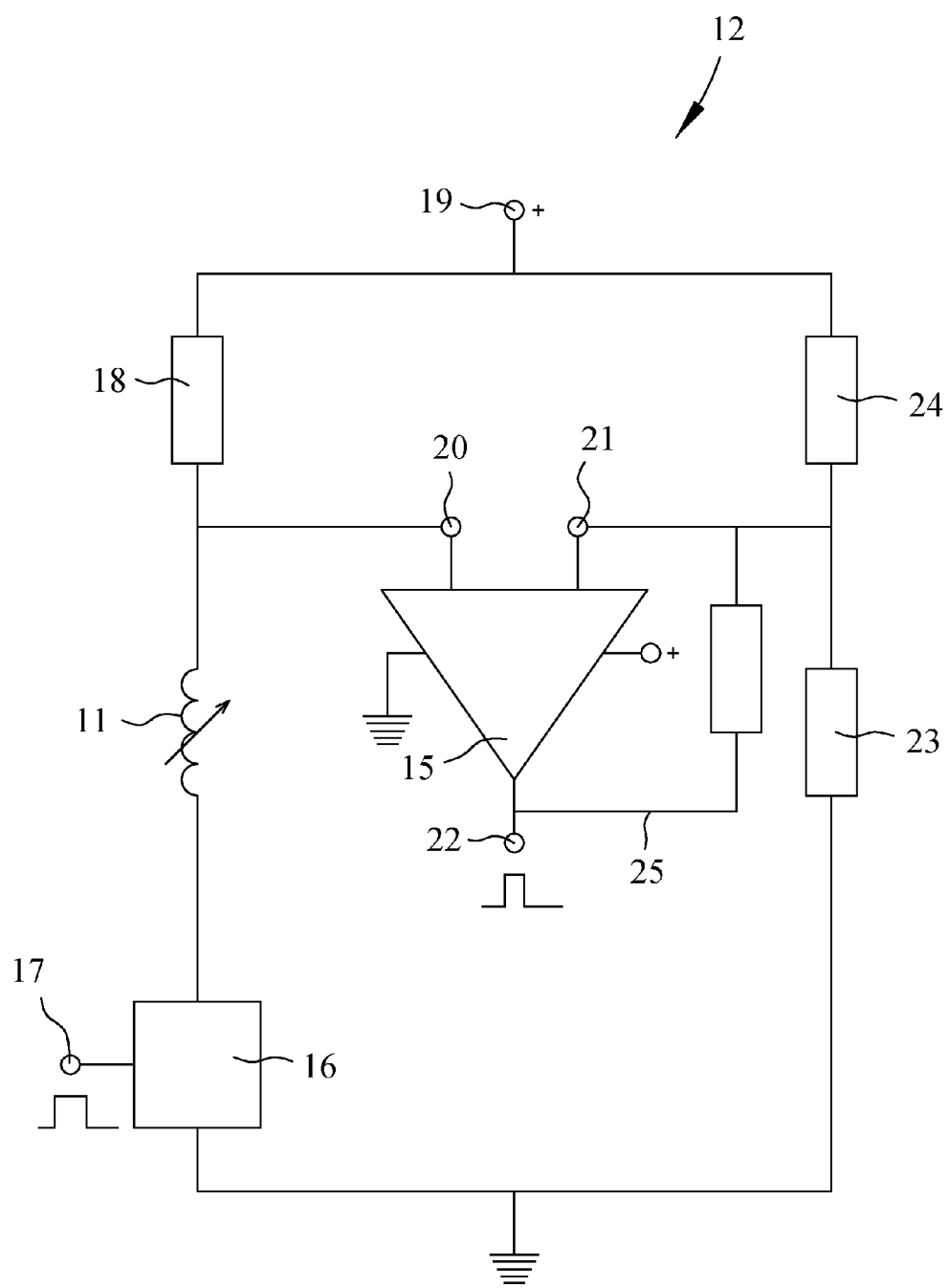
FIG. 7 is a schematic representation of a sensor circuit according to a fifth embodiment.

In order to function according to the above-mentioned second method, the sensor circuit 12 may, for instance, be realized in accordance with FIG. 6, which shows a schematic representation of the sensor circuit 12 according to a fourth embodiment, or in accordance with FIG. 7, which shows a schematic representation of the sensor circuit 12 according to a fifth embodiment. Common to these embodiments is that the measuring resistance 18 is situated between the voltage source 19 and the point on the first branch that is connected to the first input 20 of the comparator 15. It should be pointed out that the position of the power switch 16 in relation to the coil 11 and the measuring resistance 18 is freely selectable. In the fourth embodiment, shown in FIG. 6, the sensor circuit 12 comprises, in addition to what is shown in the fifth embodiment according to FIG. 7, a feedback branch 25, or amplification branch, connected between the output 22 of the comparator 15 and the second input 21 of the comparator 15.

Figure 8:
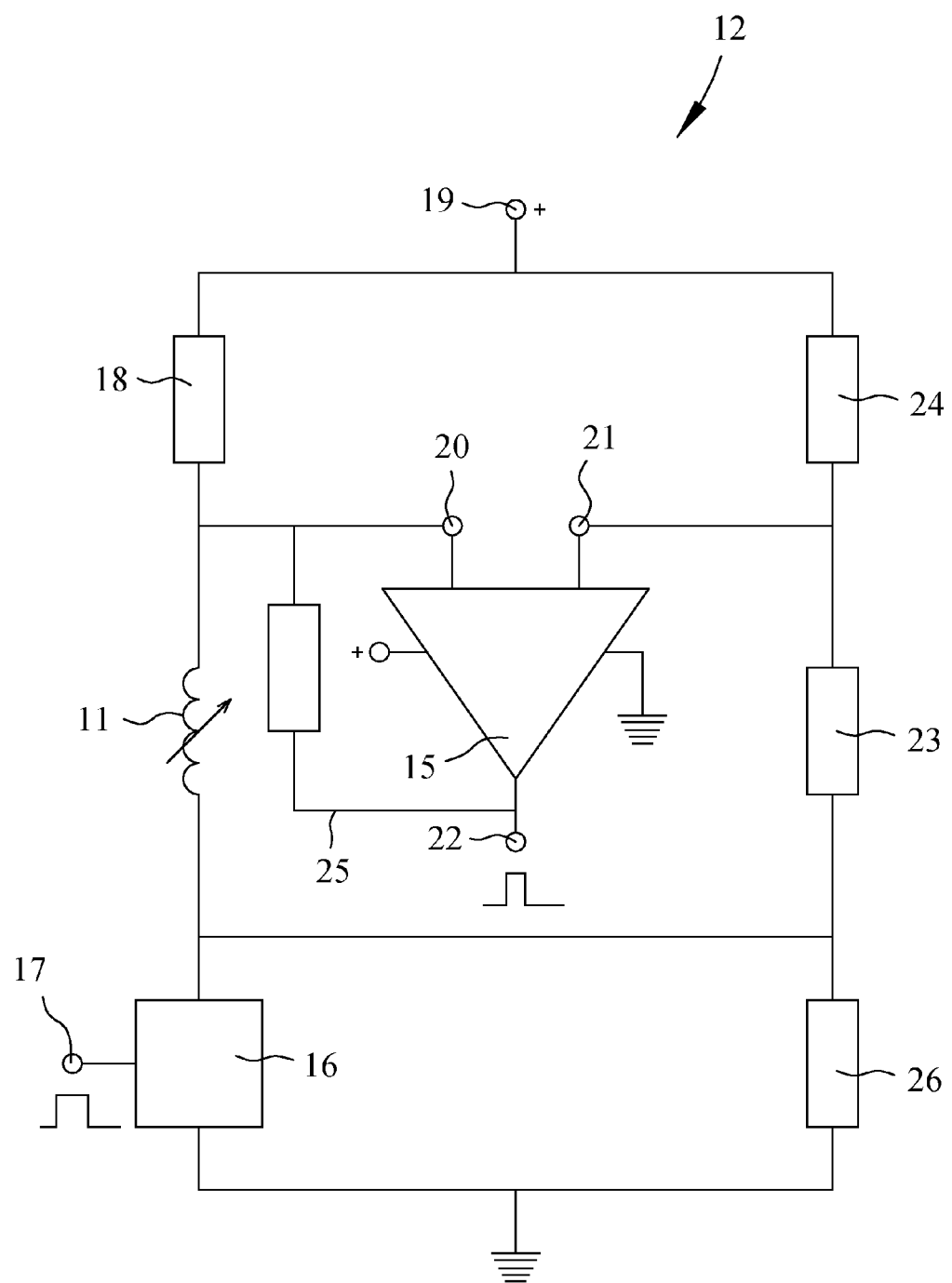
FIG. 8 is a schematic representation of a sensor circuit according to a sixth embodiment.

In FIG. 8, a schematic representation of the sensor circuit 12 according to a sixth embodiment is found, which sensor circuit is realized to function according to the above-mentioned second method. In this embodiment, the sensor circuit comprises a feedback branch 25, or amplification branch, connected between the output 22 of the comparator 15 and the first input 20 of the comparator 15, and the measuring resistance 18 is situated between the voltage source 19 and the point on the first branch that is connected to the first input 20 of the comparator 15. Furthermore, the power switch 16 is disposed adjacent to ground, as well as that the sensor circuit 12 comprises a synchronization resistance 26 that is connected in parallel across the power switch 16, each of the first branch and the second branch of the sensor circuit 12 being coupled in series with the synchronization resistance 26 as well as the power switch 16.

FEASIBLE MODIFICATIONS OF THE INVENTION

The invention is not limited only to the embodiments described above and shown in the drawings, which only have illustrating and exemplifying purpose. This patent application is intended to cover all adaptations and variants of the preferred embodiments described herein, and consequently the present invention is defined by the wording of the accompanying claims and the equipment may accordingly be modified in all feasible ways within the scope of the accompanying claims.

It should also be pointed out that all information about/regarding terms such as above, below, upper, under, etc., should be interpreted/read with the equipment orientated in accordance with the figures, with the drawings orientated in such a way that the reference numbers can be read in a proper way. Accordingly, such terms only indicate mutual relationships in the shown embodiments, which relationships may be changed if the equipment according to the invention is provided with another construction/design.

It should be pointed out that even if it is not explicitly mentioned that features from one specific embodiment can be combined with the features of another embodiment, this should be regarded as evident when possible.

The invention claimed is:

1. A method for determining a mutual position between a first body (10) and a coil (11) by means of a position sensor assembly, which comprises said first body (10), said coil (11), a control unit, and a sensor circuit (12), said first body (10) being reciprocally displaceable in the axial direction in relation to said coil (11), the sensor circuit (12) comprising a comparator (15) connected to a first branch comprising said coil (11), a power switch (16), and a measuring resistance (18) coupled in series with each other, the comparator (15) being arranged to obtain and compare an instantaneous measuring voltage across the measuring resistance (18) and an instantaneous reference voltage, and being arranged to, based on the mutual relationship between the measuring voltage and reference voltage, generate a state change of a digital output signal, the method comprising the steps of:

sending a rising edge of a digital input signal pulse from the control unit to the power switch (16) to produce a state change of the power switch (16) from open to closed, in the control unit, detecting a first state change of the output signal from the comparator (15), and determining a mutual position between said first body (10) and said coil (11) based on the time delay between the rising edge of the input signal pulse and the first state change of the output signal, or comprising the steps of:

sending a rising edge of a digital input signal pulse from the control unit to the power switch (16) to produce a state change of the power switch (16) from open to closed, in the control unit, detecting a first state change of the output signal from the comparator (15), in the control unit, detecting a second state change of said output signal, and determining a mutual position between said first body (10) and said coil (11) based on the time delay between the first state change of the output signal and the second state change of the output signal.

2. The method according to claim 1, wherein said first state change of the output signal from the comparator (15) is a rising edge of a digital output signal pulse, and wherein said second state change of the output signal from the comparator (15) is a falling edge of said digital output signal pulse.

3. The method according to claim 1, wherein the method, in addition to the steps of:
sending a rising edge of a digital input signal pulse from the control unit to the power switch (16) to produce a state change of the power switch (16) from open to closed,
in the control unit, detecting a first state change of the output signal from the comparator (15), and
determining a mutual position between said first body (10) and said coil (11) based on the time delay between the rising edge of the input signal pulse and the first state change of the output signal,
also comprises the step of:
based on the detection of said first state change of the output signal from the comparator (15), sending a falling edge of said digital input signal pulse from the control unit to the power switch (16) to produce a state change of the power switch (16) from closed to open.

4. The method according to claim 1, wherein the method, in addition to the steps of:
sending a rising edge of a digital input signal pulse from the control unit to the power switch (16) to produce a state change of the power switch (16) from open to closed,
in the control unit, detecting a first state change of the output signal from the comparator (15),
in the control unit, detecting a second state change of said output signal, and
determining a mutual position between said first body (10) and said coil (11) based on the time delay between the first state change of the output signal and the second state change of the output signal,
also comprises the step of:
based on the detection of said second state change of the output signal from the comparator (15), sending a falling edge of said digital input signal pulse from the control unit to the power switch (16) to produce a state change of the power switch (16) from closed to open.

5. A position sensor assembly for determining a mutual position between a first object (1) and a second object (2), which position sensor assembly comprises:
a first body (10) connectable to said first object (1), a coil (11) connectable to said second object (2), a control unit, and a sensor circuit (12), said first body (10) being reciprocally displaceable in the axial direction in relation to said coil (11),
the sensor circuit (12) comprises:
a first branch comprising said coil (11), a power switch (16) having an input operatively connected to said control unit for receiving individual digital input signal pulses, and a measuring resistance (18), the coil (11), the power switch (16), and the measuring resistance (18) being coupled in series with each other,
a comparator (15), which is connected to said first branch via a first input (20) to obtain an instantaneous measuring voltage across the measuring resistance (18), and which further comprises a second input (21) for obtaining an instantaneous reference voltage, and an output (22) operatively connected to said control unit for outputting individual state changes of a digital output signal based on the mutual relationship between said measuring voltage and said reference voltage.

6. The position sensor assembly according to claim 5, wherein the sensor circuit (12) comprises a feedback branch (25) connected between the output (22) of the comparator (15) and the second input (21) of the comparator (15).

7. The position sensor assembly according to claim 5, wherein the first branch of the sensor circuit (12) is connected between a voltage source (19) and ground, and wherein the sensor circuit (12) comprises a second branch, which is connected between the voltage source (19) and ground, and which comprises a first reference resistance (23) and a second reference resistance (24), which are coupled in series with each other, the second input (21) of the comparator (15) being connected to said second branch at a point situated between said first reference resistance (23) and said second reference resistance (24).

8. The position sensor assembly according to claim 7, wherein the power switch (16) is disposed adjacent to ground.

9. The position sensor assembly according to claim 8, wherein the sensor circuit (12) comprises a synchronization resistance (26) that is connected in parallel across the power switch (16), each of the first branch and the second branch of the sensor circuit (12) being coupled in series with the synchronization resistance (26) as well as the power switch (16).

10. The position sensor assembly according to claim 5, wherein said first body (10) is an electrically conductive body, preferably manufactured from aluminum.

11. The position sensor assembly according to claim 5, wherein said first body (10) is displaceable in the axial direction internally of the coil (11).

12. The method according to claim 2, wherein the method, in addition to the steps of:
sending a rising edge of a digital input signal pulse from the control unit to the power switch (16) to produce a state change of the power switch (16) from open to closed,
in the control unit, detecting a first state change of the output signal from the comparator (15),
in the control unit, detecting a second state change of said output signal, and
determining a mutual position between said first body (10) and said coil (11) based on the time delay between the first state change of the output signal and the second state change of the output signal,
also comprises the step of:
based on the detection of said second state change of the output signal from the comparator (15), sending a falling edge of said digital input signal pulse from the control unit to the power switch (16) to produce a state change of the power switch (16) from closed to open.

13. The position sensor assembly according to claim 6, wherein the first branch of the sensor circuit (12) is connected between a voltage source (19) and ground, and wherein the sensor circuit (12) comprises a second branch, which is connected between the voltage source (19) and ground, and which comprises a first reference resistance (23) and a second reference resistance (24), which are coupled in series with each other, the second input (21) of the comparator (15) being connected to said second branch at a point situated between said first reference resistance (23) and said second reference resistance (24).

* * * * *